(No Model.)
A. P. CAMPBELL.
GRAIN SCOURER.
No. 493,065. Patented Mar. 7, 1893.
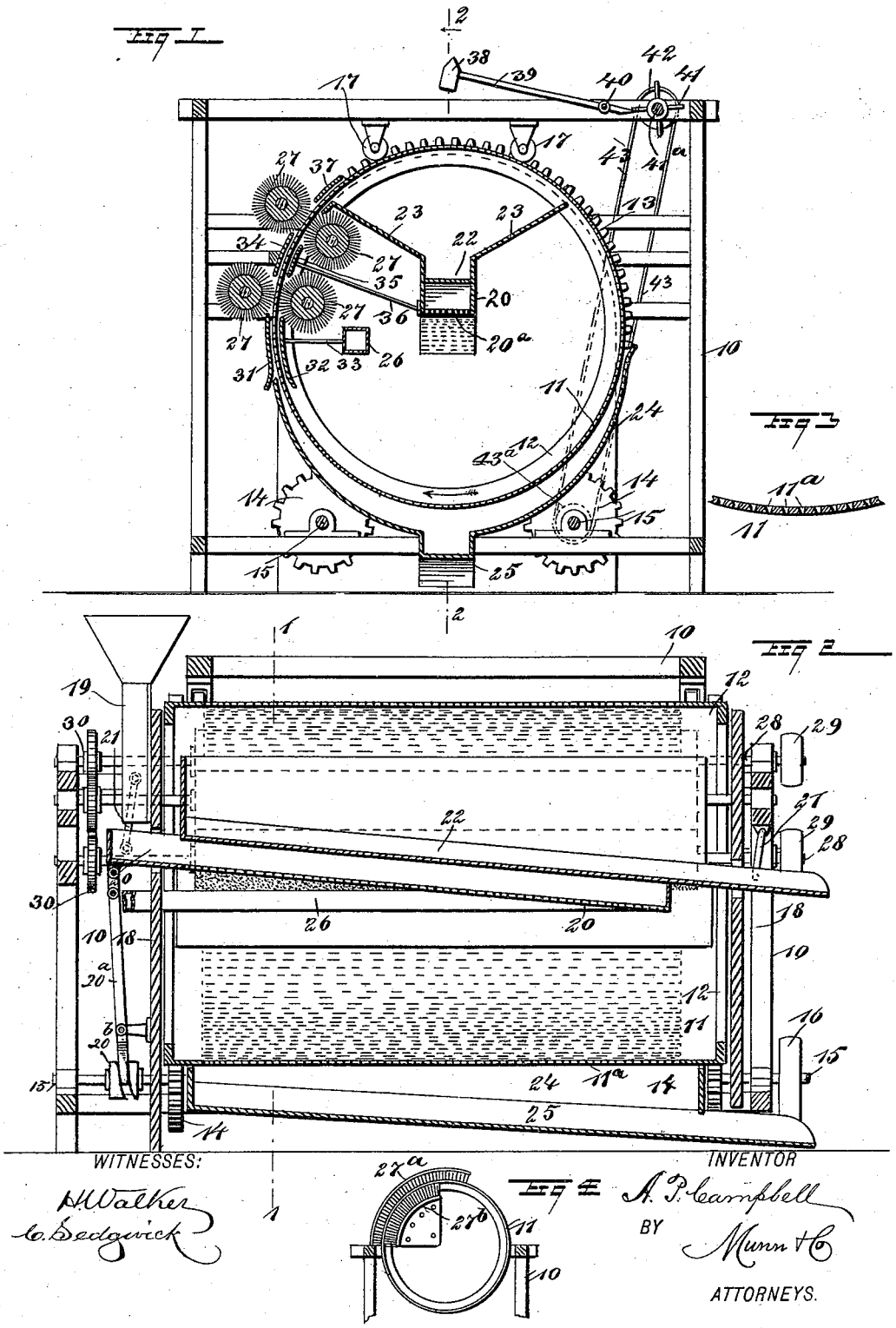

UNITED STATES PATENT OFFICE.

ARCHIBALD P. CAMPBELL, OF PORTAGE LA PRAIRIE, CANADA.

GRAIN-SCOURER.

SPECIFICATION forming part of Letters Patent No. 493,065, dated March 7, 1893.

Application filed May 16, 1892. Serial No. 433,135. (No model.)

*To all whom it may concern:*

Be it known that I, ARCHIBALD P. CAMPBELL, of Portage la Prairie, in the Province of Manitoba and Dominion of Canada, have invented a new and Improved Grain-Scourer, of which the following is a full, clear, and exact description.

My invention relates to improvements in grain-scouring machines, and the object of my invention is to produce an extremely simple and durable machine, which may be run with little power, which will enable a large quantity of grain to be nicely scoured, so as to remove all the smut and dirt from it, which will hold each individual grain so that both ends of it will be thoroughly scoured without breaking or discoloring the bran or the body of the berry, and which is provided with brushes between which the grains are passed and with mechanism adapted to deliver the clean grain into a suitable receptacle.

To this end my invention consists in certain features of construction, and combinations of parts, which will be hereinafter described and claimed.

Reference is to be had to the accompanying drawings forming a part of this specification, in which similar figures of reference indicate corresponding parts in all the views.

Figure 1 is a vertical cross section of the machine on the line 1—1 in Fig. 2. Fig. 2 is a longitudinal section on the line 2—2 in Fig. 1. Fig. 3 is a detail sectional view of a portion of the cleaning cylinder, showing in particular the shape of the grain holding perforations, and Fig. 4 is a cross sectional view on a reduced scale, showing modified forms of brushes applied to the cylinder.

The machine is provided with a light, strong frame 10, in which is held a revolving open ended cylinder 11, which cylinder is pierced by numerous perforations $11^a$, these being a little larger on the inside than on the outside, as shown in Fig. 3, so that a kernal of grain may easily enter and be held in each perforation, and the cylinder has end rims or flanges 12, which prevent the grain from dropping out at the ends. The cylinder has exteriorly and at the ends cog teeth 13, which engage cog wheel 14, which are arranged beneath the cylinder, and which support and turn it, the cog wheels being secured to driving shafts 15, having suitable driving pulleys 16. Above the cylinder are guide rollers 17, which are suspended from the frame 10 and against which the cylinder turns, these serving to prevent the displacement of the cylinder. At the ends of the cylinder are stationary heads or supports 18, and at one end of the cylinder and outside the head is a feed hopper 19, which delivers into an inclined feed spout 20, the spout being adapted to deliver into the cylinder and being formed integral with a discharge spout 22, which is arranged above the spout 20 and protrudes through one end of the cylinder and one of the heads 18, the two spouts 20 and 22 being suspended by links 21, so that they may be oscillated by means of any suitable mechanism. As shown in the drawings, the spout 20 connects by the lever $20^a$, which is fulcrumed on the machine frame, with a grooved cam wheel $20^b$ on one of the shafts 15, and the revolution of the cam wheel oscillates the lever and spout. The feed spout 20 has a perforated bottom $20^a$, through which the grain may drop into the cylinder. The discharge spout 22 has a hopper-like top formed by the diverging walls 23, and this top portion catches the grain which is dropped from the top of the cylinder, as hereinafter described, and the said grain is discharged from the lower end of the spout 22.

Beneath the cylinder is a nearly semi-cylindrical receptacle 24, which receives the small and imperfect grain which falls through the perforations of the cylinder, and in the middle portion of the receptacle is a spout 25, which discharges at one end of the machine. Extending into the cylinder is a pipe 26, which is supported in one of the heads 18, and this is adapted to connect with an ordinary exhaust fan so as to carry away the dust from the machine. On one side of the cylinder and near the top are revolving brushes 27, these being arranged in pairs on the outer and inner sides of the cylinder so as to brush against the wall of the cylinder, and they will consequently brush clean the kernels of grain which are carried by the cylinder. These brushes are carried by shafts 28, a portion of which have at one end driving pulleys 29, and at the other end the shafts are geared together, as shown at 30 in Fig. 2. Beneath the lower pair of brushes 27 are plates 31 and 32, which extend parallel with the cylinder wall, and are arranged on opposite sides thereof, as shown in Fig. 1, the outer plate 31 being supported in the frame 10, and the inner plate 32 being supported by arms 33, which are secured to the pipe 26.

Above the lower pair of brushes are similarly arranged plates 34 and 35, the outer plate 34 being supported in the frame 10, and the plate 35 by arms 36, which are secured to the spout 20. Above the upper pair of brushes and near the exterior of the cylinders is a similar plate 37, and the object of these several plates is to hold the grain in place in the cylinder perforations, so that it will be properly acted upon by the brushes 27.

Above the cylinder is a hammer 38, having a handle 39, which is fulcrumed on the frame 10, as shown at 40, and the short end of which extends into the path of the revolving arms 41, carried by a shaft $41^a$ which has a driving pulley 42 driven by a belt 43 which connects with a pulley $43^a$ on one of the shafts 15. When the shaft $41^a$ is revolved, the arms 41 acting successively on the hammer handle 39, will trip the handle 39 so as to repeatedly raise and drop the hammer 38, which, striking on the cylinder 11, will shake loose the grain kernels carried by the cylinder, so that they will drop into the feed spout 22.

The operation of the machine is as follows: A continuous stream of grain to be cleaned is fed to the spout 20 from the hopper 19, and the grain will be distributed through the perforated bottom of the spout upon the lower portion of the cylinder 11. The rotation of the cylinder carries with it the kernels of grain, which catch in the perforations of the cylinder, and the grain after being brushed by the brushes 27 is dropped into the hopper-like top 23 of the discharge spout 22 and by the spout it is discharged at one end of the machine. The small and imperfect grain drops through the bottom of the cylinder into the receptacle 24 and spout 25 and is discharged in a separate place.

In Fig. 4, I have shown a modified arrangement of the brushes, which perform the same function as the brushes 27, in which case a curved stationary brush $27^a$, fits against the outer wall of the cylinder and a similar brush $27^b$, is held in the stationary position within the cylinder and opposite the brush $27^a$ so as to fit against the inner wall of the cylinder, and the brushes will brush clean the grain which is carried between them.

It will be understood that any desired number of cylinders may be used together without departing from the principle of my invention, and two or more cylinders are preferable to one, as sizing of grain can be better carried on with a number of cylinders.

In using the machine, the grain is not passed through it until it has been put through an ordinary cleaner and the greater part of the dirt removed.

Having thus fully described my invention, I claim as new and desire to secure by Letters Patent—

1. A grain scourer, comprising a revoluble perforated cylinder, the perforations being adapted to receive the grain, means for delivering grain into the cylinder and for removing the same, and revoluble brushes held to impinge on opposite sides of the cylinder shell, substantially as described.

2. A grain scourer, comprising a revoluble perforated cylinder, the perforations being slightly larger on the inner side of the cylinder than on the outside, suitable means for delivering grain to the cylinder and removing it from the same, and brushes held to impinge on both sides of the cylinder walls, substantially as described.

3. A grain scourer, comprising a revoluble perforated cylinder, mechanism for delivering grain into and removing it from the cylinder, plates arranged near the outer and inner walls of the cylinder, and revolving brushes arranged adjacent to the plates and adapted to impinge upon the cylinder, substantially as described.

ARCHIBALD P. CAMPBELL.

Witnesses:
W. J. JAMES,
A. J. GREEN.